US007233658B2

(12) United States Patent
Koser et al.

(10) Patent No.: US 7,233,658 B2
(45) Date of Patent: Jun. 19, 2007

(54) FLEXIBLE RING-TONE SERVICE

(75) Inventors: Thomas Daniel Koser, San Diego, CA (US); Jeffrey L. Scruggs, Round Rock, TX (US); Stephen Mark Mueller, Austin, TX (US)

(73) Assignee: AT&T Knowledge Ventures, L.P., Austin, TX (US)

( * ) Notice: Subject to any disclaimer, the term of this patent is extended or adjusted under 35 U.S.C. 154(b) by 600 days.

(21) Appl. No.: 10/216,781

(22) Filed: Aug. 13, 2002

(65) Prior Publication Data

US 2004/0032946 A1 Feb. 19, 2004

(51) Int. Cl.
H04M 1/00 (2006.01)
H04M 3/00 (2006.01)
(52) U.S. Cl. .............................. 379/373.01; 379/215.01
(58) Field of Classification Search ........... 379/373.01, 379/373.02
See application file for complete search history.

(56) References Cited

U.S. PATENT DOCUMENTS

| 5,228,080 | A | | 7/1993 | Nutter et al. | |
|---|---|---|---|---|---|
| 5,481,599 | A | | 1/1996 | MacAllister et al. | |
| 5,526,406 | A | | 6/1996 | Luneau | |
| 5,926,537 | A | * | 7/1999 | Birze | 379/252 |
| 5,973,612 | A | | 10/1999 | Deo et al. | |
| 6,094,587 | A | | 7/2000 | Armanto et al. | |
| 6,108,630 | A | | 8/2000 | Kuechler et al. | |
| 6,272,127 | B1 | * | 8/2001 | Golden et al. | 370/352 |
| 6,308,086 | B1 | | 10/2001 | Yoshino | |
| 6,347,136 | B1 | | 2/2002 | Horan | |
| 6,370,149 | B1 | * | 4/2002 | Gorman et al. | 370/419 |
| 6,381,320 | B1 | * | 4/2002 | Creamer et al. | 379/201.01 |
| 6,389,010 | B1 | * | 5/2002 | Kubler et al. | 370/353 |
| 6,714,637 | B1 | * | 3/2004 | Kredo | 379/215.01 |
| 6,778,648 | B1 | * | 8/2004 | Alston et al. | 379/93.27 |
| 7,020,497 | B2 | * | 3/2006 | Deeds | 455/567 |
| 2002/0176404 | A1 | * | 11/2002 | Girard | 370/352 |
| 2002/0193094 | A1 | * | 12/2002 | Lawless et al. | 455/407 |
| 2003/0084121 | A1 | * | 5/2003 | De Boor et al. | 709/218 |
| 2003/0110212 | A1 | * | 6/2003 | Lewis | 709/203 |
| 2003/0125957 | A1 | * | 7/2003 | Puterbaugh et al. | 704/275 |
| 2003/0131353 | A1 | * | 7/2003 | Blom et al. | 725/25 |
| 2003/0219110 | A1 | * | 11/2003 | Tsai et al. | 379/373.01 |
| 2004/0067751 | A1 | * | 4/2004 | Vandermeijden et al. | 455/414.1 |
| 2004/0105534 | A1 | * | 6/2004 | Dezonno | 379/114.13 |
| 2004/0260824 | A1 | * | 12/2004 | Berard et al. | 709/230 |
| 2005/0053218 | A1 | * | 3/2005 | Kim | 379/211.02 |

OTHER PUBLICATIONS

"Communications Enhancements Made Possible by Caller-ID", IBM Technical Disclosure Bulletin, Oct. 1994, pp. 27-30.

(Continued)

Primary Examiner—Ramnandan Singh
(74) Attorney, Agent, or Firm—Greenblum & Bernstein, P.L.C.

(57) ABSTRACT

A subscriber associates a ring-tone media selection based on a media genre, author, or title to a calling number. When an incoming call is detected, a particular ring-tone media selection, based on the subscriber's association, may be streamed from a central server to the subscriber's customer premises equipment and then played. Alternatively, when an incoming call is detected, a particular ring-tone selection indicator, based on the subscriber's association, may be sent from a central server to the subscriber's customer premises equipment which then plays a pre-stored ring-tone selection media associated with the indicator.

39 Claims, 8 Drawing Sheets

OTHER PUBLICATIONS

"USA—Sprint PCS to offer downloadable ring tones", Mobile Youth, downloaded on Apr. 5, 2002, <http://www.mobileyouth.org/news/mobileyouth225.html.

"Ringtones for your mobile phone", Tele2, Oct. 17, 2001, <http://www.tele2.1v/en/ringtones.php>.

"www.download-ringtones.com", downloaded on Mar. 28, 2002, <http://www.download-ringtones.com/index.htm? hitrecorded=1&noexit=1>.

"EMI Music to be available for Nokia Mobile Phones", Mobile Phone Guided Network, Aug. 30, 2000, http://www.mobile-phone-guide.co.uk/news/09/nokia_emi.htm>.

"Nokia licenses EMI songs for ring tones", CNN.com—Technology, by Johnston, Sep. 1, 2000, <http://www.cnn.com/2000/TECH/computing/09/01/nokia.songs.idg/>.

"Cell phone songs pick up in the USA", USA Today, by Ramirez, Jan. 2, 2002, <http://www.usatoday.com/life/cyber/bonus/qa/2002/01/02/cell-phone-tunes.htm>.

"Priority Ringing", Pacific Bell Telephone Company, downloaded Mar. 20, 2002, <http://www.pacbell.com/Products_Services/Residential/ProdInfo_1/1,1973,20,00.html>.

* cited by examiner

FLEXIBLE RING-TONE SERVICE

BACKGROUND OF THE INVENTION

1. Field of the Invention

The present invention relates to the field of telecommunications. More particularly, the present invention relates to a subscriber associating a ring-tone media selection, based on a media genre, author, or title, to a calling party and sending the media selection or associated media selection indicator to a subscriber's communications device to play the associated ring-tone when the calling party calls.

2. Acronyms

The written description contains acronyms that refer to various telecommunications services, components and techniques, as well as features relating to the present invention. Although some of these acronyms are known, use of these acronyms is not strictly standardized in the art. For purposes of the written description, the acronyms are defined as follows:

Advanced Intelligent Network (AIN)
Central Office (CO)
Digital Subscriber Line (DSL)
Dual Tone Multi-Frequency (DTMF)
Electronic Key Telephone System (EKTS)
Electronic Worldwide Switch Digital (EWSD)
Enhanced Media Resource Server (eMRS)
Extensible Markup Language (XML)
Flexible Ring-Tone (FlexRing)
Generic Data Interface (GDI)
Graphical User Interface (GUI)
Graphics Interchange Format (GIF)
HyperText Mark-Up Language (HTML)
HyperText Transfer Language Protocol (HTTP)
Intelligent Peripheral (IP)
Intelligent Service Control Point (ISCP)
International Telecommunications Union (ITU)
Internet Engineering Task Force (IETF)
Joint Photographic Experts Group (JPEG)
Interactive Voice Response (IVR)
Lightweight Directory Access Protocol (LDAP)
Media Gateway Control Protocol (MGCP)
Originating Basic Call State Model (OBCSM)
Outgoing Call Control (OCC)
Personal Computer (PC)
Personal Call Manager/Personal Communications Manager (PCM)
Plain Old Telephone Service (POTS)
Public Switched Telephone Network (PSTN)
Request For Comments (RFC)
Service Control Point (SCP)
Service Management System (SMS)
Service Node/Intelligent Peripheral (SN/IP)
Service Switching Point (SSP)
Session Initialization Protocol URL (SIP URL)
Signaling System 7 (SS7)
Signaling Transfer Point (STP)
Session Initialization Protocol (SIP)
Transaction Capabilities Application Part (TCAP)
Telephonic URL (TEL URL)
Termination Basic Call State Model (TBCSM)
Transmission Control Protocol/Internet Protocol (TCP/IP)
Uniform Resource Identifier (URI)
Uniform Resource Locator (URL)
Uniform Resource Name (URN)
Voice Over Internet Protocol (VoIP)
World Wide Web (WWW)
World Wide Web Consortium (W3C)

3. Background Information

Currently, phone service subscribers are alerted to an incoming call by a ring generated by a subscribers telephone/customer premises equipment (CPE). CPE rings are typically generated by the CPE itself in response to a ring signal sent from the subscriber's local switch/service switching point (SSP). In such a scenario, the subscriber's local SSP generates ring signals and sends them to a subscriber's CPE when it receives an incoming call notification of a call destined for the subscriber. The subscriber's CPE rings upon receiving the ring signal from the local SSP. The ring is typically mechanically or electrically generated by the CPE itself.

In some CPE models, an internal bell installed during manufacture is rung in response to a ring signal from an SSP. In other CPE models, simple audio tones in the form of audio patterns form an audio ring. These types of CPEs are limited in that a user must answer the phone to determine who or what is calling the user.

To overcome this limitation, some CPEs include a caller ID display enabling a user to know who is calling by providing a caller ID display so the user can view the number of the entity calling prior to answering. This, however, is still limiting since the user typically has to be in view of the CPE caller ID display in order to find out who the caller is.

Mobile phone devices have overcome this limitation by including melodies as part of their initial programming at manufacture. Users of these devices associate a preprogrammed melody with a particular phone number; typically by a mobile phone menu system. When a mobile phone receives an incoming call, it uses the calling number provided by a caller ID service and checks to see if a melody within the mobile phone is associated with the calling number. If a match is present, the mobile phone plays the user programmed melody associated with the calling number to audibly alert the user of who or what is calling. Otherwise, a default melody or pattern is played to audibly alert the mobile phone user of the incoming call.

Each of the above devices is deficient in that they are very limiting as far as the selection of media playable, the number of devices that can be associated with a single programming, the complexity of media playable, and the ways of programming the associations of media to caller numbers.

The present invention overcomes the problems associated with the prior art, as described below.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF EMBODIMENTS

Figure 1:
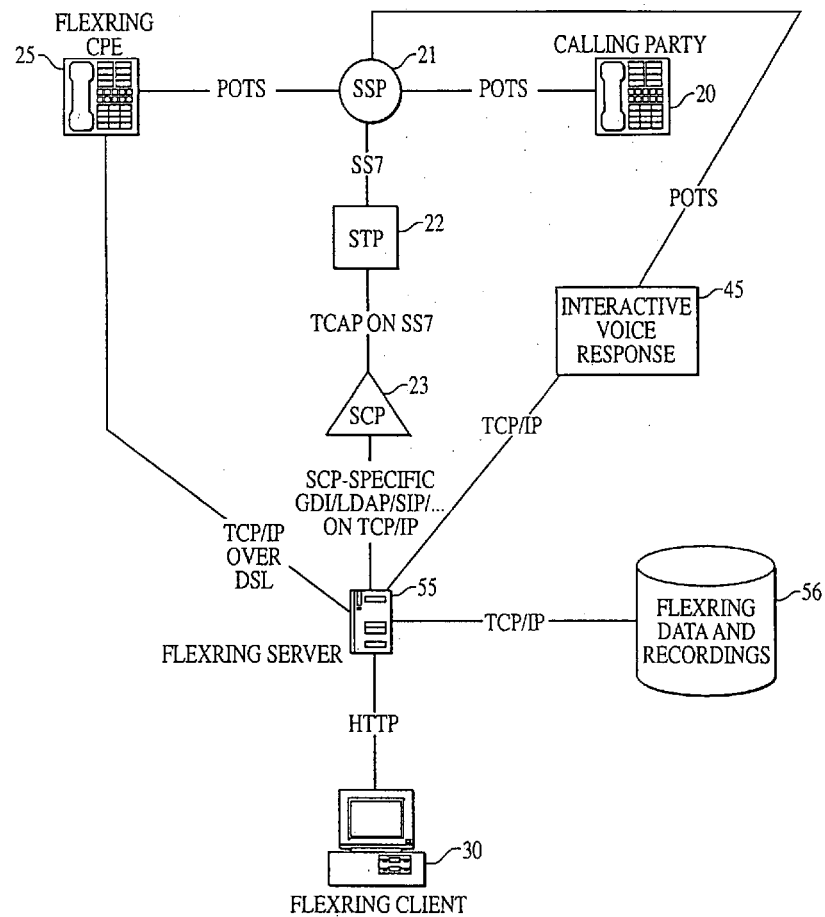
FIG. 1 is a block diagram showing an exemplary flexible ring-tone service telecommunications network associated with a Public Switched Telephone Network (PSTN), according to an aspect of the present invention.

The present invention relates to enhancing Advanced Intelligent Network (AIN) call services to further resolve the previously identified problems, simply and efficiently. More specifically, the present invention enables a subscriber to associate a media selection to a caller's number so that the selected media can be played by a subscriber's CPE when it receives a call from the associated caller's number. The media may be of various formats, e.g., RealNetwork's Real Audio, Microsoft's Windows Media Audio, WAV, MP2, MP3, MP4, Graphics Interchange Format (GIF), or Joint Photographic Experts Group (JPEG). The media may include audio, motion pictures, or still picture information or a combination, thereof, to be played by the subscriber's CPE. The caller's number may be in the format of a telephone number, Uniform Resource Identifier (URI), Uniform Resource Locator (URL), Uniform Resource Name (URN), E-mail address, Session Initialization Protocol URL (SIP URL), Telephonic URL (TEL URL), instant message address, Service Management System (SMS) address, or other addressing scheme.

The media may be stored at a central flexible ring-tone service (FlexRing) Data and Recordings Database or stored locally at a receiving party's CPE. In the case that the media is stored in a central FlexRing Data and Recordings Database, the media is streamed to the CPE through a FlexRing Server where it is then played by the CPE prior to the subscriber answering an incoming call. In the case that the media is stored at the CPE, the CPE plays the media in response to a switch stimulus prior to the subscriber answering an incoming call.

In the case that the FlexRing Service is stored centrally and managed by a FlexRing Service provider, the subscriber obtains the benefits of a large selection of media and the benefit of simply provisioning the FlexRing Service once for him or herself. This can be the case where the subscriber has multiple subscriber numbers by which the subscriber can be reached, multiple CPEs for each subscriber number, or both.

Moreover, when the media is stored locally or centrally, the invention enables the subscriber to associate media of a particular genre, media by a particular artist, or media by title to a calling number for play by the subscriber's CPE. For example, if the subscriber's cousin were to call the subscriber, and the subscriber had previously associated the genre of rock music to play when the subscriber's cousin calls, a popular rock music selection could be randomly or sequentially picked by the FlexRing Service for play by the subscriber's CPE. Likewise, if the subscriber's parents were to call the subscriber, a Mozart, Liszt, or Schumann selection could be played by the subscriber's CPE. Furthermore, if the subscriber's ex-spouse were to call, Beethoven's Fifth Symphony could be played. And if the subscribers neighbor were to call, an audio clip could be played stating, "Your neighbor is calling".

Furthermore, the subscriber may select a particular genre, artist, or selection of media to play for all callers, all callers identifiable by caller ID, or all callers not identifiable by caller ID. Moreover, the subscriber may select or allow a FlexRing Service provider to select a particular genre, artist, or selection of media to play based on the different fields of the calling number. For example, if the country code of the calling number was Switzerland, a yodeling clip could be preprogrammed by the subscriber or the FlexRing service provider to play on the subscriber's CPE.

The subscriber may associate media to calling numbers in a provisioning process using a rotary or touch-tone device, a voice recognition system, a network interface such as a web browser, a call center, or other telecommunications services.

An additional advantage of the FlexRing Service is that the service, itself, can generate revenues based on storage space used. For example, the FlexRing Service may allow a subscriber to upload media into the FlexRing Service for eventual mapping of media to a calling party and charge based on the amount of storage required. Alternatively, the FlexRing Service can have a large library of media from which the FlexRing Service charges the subscriber based on the size of library from which the subscriber can access. Further, the FlexRing Service may also charge by how many associations a subscriber has between media and a calling party. The FlexRing Service provides a service provider with many options for generating revenues.

In view of the above, the present invention through one or more of its various aspects and/or embodiments is presented to accomplish one or more objectives and advantages, such as those noted below.

An embodiment of the present invention provides a telecommunications ring-tone system including a ring-tone database that stores ring-tones for subscribers and a ring-tone server. The ring-tone server receives configuration information from a subscriber including information associating ring-tones to caller information. It, additionally, receives an incoming call signal for a call to the subscriber including at least part of the caller information. The ring-tone server further selects a subscriber ring-tone based on the configuration information and the incoming call signal, and streams at least a part of the subscriber ring-tone to a communications device of the subscriber in response to the incoming call signal.

According to an aspect of the embodiment, each ring-tone is classified into a category and the configuration information includes category information. In another aspect of the embodiment, the subscriber ring-tone includes streaming media and/or still picture media. In a further aspect of the embodiment, the subscriber can associate a portion of the caller information to a ring-tone category or ring-tone.

In another embodiment of the present invention, a telecommunications ring-tone system includes a ring-tone database that stores ring-tones for subscribers. The system further includes a ring-tone server that streams at least a part of a ring-tone to a communications device of a subscriber in response to an incoming call signal to the subscriber.

According to an aspect of the embodiment, the ring-tone server receives configuration information from a subscriber including information associating ring-tones to caller information, each ring-tone is classified into a category, and the configuration information includes category information. In a further aspect of the above embodiment, the category includes genre, artist, and/or title of media information. In another aspect of the above embodiment, the ring-tone includes streaming media and/or still picture media. In another aspect of the embodiment, the telecommunications ring-tone system is part of an advanced intelligent network.

In another embodiment of the present invention, a telecommunications ring-tone system includes a ring-tone database that stores ring-tones for subscribers and a ring-tone server. The ring-tone server receives configuration information from a subscriber including information associating ring-tones to caller information. The server further receives an incoming call signal for a call to the subscriber including at least part of the caller information. Moreover, the server selects a subscriber ring-tone from the ring-tones based on the configuration information and the incoming call signal, and sends an indicator associated with the subscriber ring-tone to a communications device of the subscriber in response to the incoming call signal. The indicator includes information used by the communications device to play the subscriber ring-tone.

In an aspect of the embodiment, each ring-tone is classified into a category and the configuration information includes the category information. In a further aspect of the embodiment, the category includes genre, artist, and/or title of media information. In another aspect, the subscriber ring-tone includes streaming media and/or still picture media. In a further aspect, the subscriber can associate a portion of the caller information to a ring-tone category or ring-tone.

According to another embodiment of the present invention, a method of providing a ring-tone to a subscriber's communications device includes storing ring-tones for subscribers. The method further includes receiving configuration information from a subscriber including information associating ring-tones to caller information. The method further includes receiving an incoming call signal for a call to the subscriber including at least part of the caller information. Moreover, the method includes selecting a subscriber ring-tone based on the configuration information and the incoming call signal, and streaming at least a part of the subscriber ring-tone to a communications device of the subscriber in response to the incoming call signal.

In an aspect of the embodiment, each ring-tone is classified into a category and the configuration information includes category information. According to another aspect, the subscriber ring-tone includes streaming media and/or still picture media. In a further aspect, the embodiment includes associating by the subscriber a portion of the caller information to a ring-tone category or ring-tone. In another aspect, the category includes genre, artist, and/or title of media information.

In another embodiment of the present invention, a method of providing a ring-tone to a subscriber's communications device includes storing ring-tones for subscribers and streaming at least a part of a ring-tone to a communications device of a subscriber in response to an incoming call signal to the subscriber.

In an aspect of the embodiment, the ring-tone server receives configuration information from a subscriber including information associating ring-tones to caller information, each ring-tone is classified into a category, and the configuration information includes category information. In another aspect, the category includes genre, artist, and/or title of media information. In a further aspect, the ring-tone includes streaming media and/or still picture media. In another aspect, the caller information includes a telephone number, uniform resource identifier, uniform resource locator, uniform resource name, E-mail address, session initialization protocol uniform resource locator, telephonic uniform resource locator, instant message address, or service management system address information.

In another embodiment of the present invention, a method of providing a ring-tone to a subscriber's communications device includes storing ring-tones for subscribers, and receiving configuration information from a subscriber including information associating ring-tones to caller information. The embodiment further includes receiving an incoming call signal for a call to the subscriber including at least part of the caller information. Moreover, the embodiment includes selecting a subscriber ring-tone based on the configuration information and the incoming call signal, and sending an indicator associated with the subscriber ring-tone to a communications device of the subscriber in response to the incoming call signal. The indicator includes information used by the communications device to play the subscriber ring-tone.

According to an aspect of the embodiment, each ring-tone is classified into a category and the configuration information includes the category information. In another aspect, the category includes genre, artist, and/or title of media information. In a further aspect, the subscriber ring-tone includes streaming media and/or still picture media. In a further aspect, the embodiment further includes associating by the subscriber a portion of the caller information to a ring-tone category or ring-tone.

In another embodiment of the present invention, a computer-readable medium stores computer-executable instructions for directing a computer. The instructions include storing ring-tones for subscribers, and receiving configuration information from a subscriber including information associating ring-tones to caller information. The instructions further include receiving an incoming call signal for a call to the subscriber including at least part of the caller information. Moreover, the instructions include selecting a subscriber ring-tone from the ring-tones based on the configuration information and the incoming call signal, and streaming at least a part of the subscriber ring-tone to a communications device of the subscriber in response to the incoming call signal.

In an aspect of the embodiment, each ring-tone is classified into a category and the configuration information includes category information. In another aspect, the subscriber ring-tone includes streaming media and/or still picture media. In a further aspect, the instructions further include associating by the subscriber a portion of the caller information to a ring-tone category or ring-tone. In another aspect, the category includes genre, artist, and/or title of media information.

In another embodiment of the present invention, a computer-readable medium stores computer-executable instructions for directing a computer. The instructions include storing ring-tones for subscribers, and streaming at least a part of a ring-tone to a communications device of a subscriber in response to an incoming call signal to the subscriber.

In an aspect of the embodiment, the ring-tone server receives configuration information from a subscriber including information associating ring-tones to caller information, each ring-tone is classified into a category, and the configuration information includes category information. In another aspect, the category includes genre, artist, and/or title of media information. In a further aspect, the ring-tone includes streaming media and/or still picture media. In another aspect, the caller information includes a telephone number, uniform resource identifier, uniform resource locator, uniform resource name, E-mail address, session initialization protocol uniform resource locator, telephonic uniform resource locator, instant message address, or service management system address information.

In another embodiment of the present invention, a computer-readable medium stores computer-executable instructions for directing a computer. The instructions include storing ring-tones for subscribers, and receiving configuration information from a subscriber including information associating ring-tones to caller information. The instructions further include receiving an incoming call signal for a call to the subscriber including at least part of the caller information. Moreover, the instructions include selecting a subscriber ring-tone based on the configuration information and the incoming call signal, and sending an indicator associated with the subscriber ring-tone to a communications device of the subscriber in response to the incoming call signal. The indicator includes information used by the communications device to play the subscriber ring-tone.

In an aspect of the embodiment, each ring-tone is classified into a category and the configuration information includes the category information. In a further aspect, the category includes genre, artist, and/or title of media information. In another aspect, the subscriber ring-tone includes streaming media and/or still picture media. If a further aspect, the instructions further include associating by the subscriber a portion of the caller information to a ring-tone category or ring-tone.

The various aspects and embodiments of the present invention are described in detail below.

FlexRing Service

The FlexRing Service is an AIN based service that allows a subscriber to customize a subscriber's CPE ring-tone by associating a media genre, author, or title to a calling number. Customized ring-tones may be stored locally on the Subscriber's CPE or stored centrally by a FlexRing Service Provider. The FlexRing Service may be provisioned using a Personal Call Manager (PCM) service as disclosed in U.S. patent application Ser. No. 09/619,312, to BHANDARI et al., filed Jul. 19, 2000, the disclosure of which is expressly incorporated, herein, by reference in its entirety, or it may be provisioned separately using PCM like components. A PCM service allows a subscriber connected to a communications network, including the Internet and other packet switched type data networks, as well as through Interactive Voice Response (IVR) systems, including IVR functionality that may be provided by Service Node/Intelligent Peripherals (SN/IPs), to customize ring-tone services associated with telephonic communications, with near real-time access to the service data.

FIG. 1 is a block diagram showing an exemplary FlexRing Service telecommunications network associated with a Public Switched Telephone Network (PSTN), according to an aspect of the present invention. The network includes a Calling Party CPE 20, a service switching point (SSP) 21, and a subscriber CPE 25. The subscriber CPE 25 is a device compatible with a PSTN as well as another type of communications network, such as the Internet. To be compatible with the PSTN, the CPE 25 may be a plain old telephone service (POTS) telephone, Centrex telephone, PBX telephone, or have electronic key telephone system (EKTS) functionality. The CPE 25 may also be a personal computer, Internet appliance, Microsoft tablet, or a 3Com Audry product. To be compatible with the Internet or other network, the CPE 25 may be compatible and interface with Digital Subscriber Line (DSL), cable, Transmission Control Protocol/Internet Protocol (TCP/IP) or other network systems.

The SSP 21 communicates with the CPE 25 and the Calling Party 20 using standard POTS networking. The SSP 21 additionally communicates with signaling transfer point (STP) 22 using the SS7 protocol. Depending on the call origination point, more than one SSP may be used, for example, when the subscriber and the caller use a different SSP.

The SSP 21 includes, for example, a 1AESS or 5ESS switch manufactured by Lucent Technologies, Inc.; a DMS-100 switch manufactured by Nortel Networks Corporation (Nortel); an AXE-10 switch manufactured by Telefonaktiebolaget LM Ericsson, or an Electronic Worldwide Switch Digital (EWSD) switch available from Siemens Information and Communication Networks, Inc. The switch may utilize an AIN Release 0.1 (or later) protocol. However, embodiments of the present invention may include a switch, such as an ATM switch, that is incorporated into any alternative telecommunications technology.

The exemplary network also includes a signaling transfer point (STP) 22, a service control point (SCP) 23, an IVR 45, a FlexRing Server 55, a FlexRing Data and Recordings Database 56, and a FlexRing Client 30. STP 22 communicates with the SSP 21 using the SS7 protocol and the SCP 23 using TCAP on SS7.

The SCP 23, by way of example, is implemented with the Telecordia Integrated Service Control Point, loaded with Intelligent Service Control Point (ISCP) software Version 4.4 (or higher), available from Telecordia, Murray Hill, N.J. In an alternative embodiment of the invention, the SCP 23 may be a Lucent Enhanced Communications Server SCP, with software release 94, available from Lucent Technologies, Inc. The SCP 23 communicates with STP 22 using TCAP on SS7 and the FlexRing Server using a Generic Data Interface (GDI), Lightweight Directory Access Protocol (LDAP), and Session Initiation protocol (SIP) over a TCP/IP connection. The SIP protocol is defined in Internet Engineering Task Force (IETF) Request For Comments (RFC) 2543.

The call flow logic of the present invention may be upgraded to accommodate future AIN releases and protocols and future trigger types. Specifications of AIN Release 0.1 SSPs may be found in Telecordia GR 1299, Switch-Service Control Point Application Protocol Interface Generic Requirements, and Telecordia Technical Reference TR-NWT-001284, AIN Switching Systems Generic Requirements, the disclosures of which are expressly incorporated by reference herein in their entireties.

In an embodiment of the IVR 45, the IVR 45 may be incorporated in a SN/IP, such as an IBM Resource Manager, a Lucent Compact Service Node or a Lucent Enhanced Media Resource Server (eMRS). The IVR 45 is accessible through a PSTN central office switch (CO), such as the SSP 21 or via a VoIP system. When communicating with a SSP 21, a standard POTS protocol is used. When communicating with the FlexRing Server 55, GDI, LDAP, and SIP on TCP/IP are used.

From any Dual Tone Multi-Frequency (DTMF) telephone, the subscriber may input a number, e.g., an 800 number or local service provider number, to access the IVR 45. Alternatively, the subscriber may dial a star code, such as *95, in response to which the SSP 21 has been programmed to route the connection to the IVR 45 to access a particular AIN service, such as the FlexRing Service. The IVR 45 may also be accessed over a VoIP network as well.

The IVR 45 may also be provided with speech recognition functionality. For example, in response to automated voice prompts, an IBM Resource Manager, programmed with speaker independent Nuance 8.0 speech recognition software, available from Nuance Communications, may receive and interpret voice input from the caller, in addition to touch tone signals. Any comparable speech recognition system may likewise be incorporated into the system, such as a Lucent Compact Service Node.

The IVR 45 with speech recognition functionality captures analog voice signals of the subscriber and converts the voice signals to digital data, which may be stored in relation to the subscriber's FlexRing account. The data is segmented, or arranged into recognizable patterns, and compared to previously stored models of words to be recognized.

FIG. 1 also includes a FlexRing Client 30, a FlexRing Server 55, and a FlexRing Data and Recordings Database 56 connectable through a network such as the Internet. The FlexRing Client 30 includes a graphical user interface (GUI) and may connect to the network using a T1, cable modem connection, DSL connection or other network/Internet interface connection, such as a telephone modem connection through the subscriber's CPE 25 line and the associated SSP 21. The FlexRing Client 30, alternatively, can be run as a client in close proximity to the FlexRing Server 55. The FlexRing Client 30 may incorporate a web browser which communicates with the FlexRing Server 55 using HyperText Transfer Protocol (HTTP), such as Microsoft Internet Explorer, available from Microsoft Corporation, or Netscape Navigator, available from Netscape Communications Corporation. In one embodiment, the FlexRing Client 30 is implemented on an IBM Pentium based personal computer (PC), running the Linux operating system, available from, for example, Free Software Foundation, Inc., or the Microsoft Windows operating system. The FlexRing Client 30 may also be implemented as a non-browser program such as a program written in C, C++ or other programming language.

An embodiment of the FlexRing Server 55 may include the Linux or Microsoft Windows operating system and the Apache web server software, available from the Apache Software Foundation, or the Jigsaw web server software, available from World Wide Web Consortium (W3C). Using such server software, the FlexRing Server 55 is able to communicate with World Wide Web (WWW) clients using HTTP messages, HyperText Markup Language (HTML) or Extensible Markup Language (XML) content. The FlexRing Server 55 may additionally be accessed using other client programs as well, such as those written in C, C++, or other computer language.

The FlexRing Data and Recordings Database 56 communicates with the FlexRing Server 55. Communication between the Database 56 and the FlexRing Server 55 may follow LDAP or SQL protocols. The Database 56 may be an Oracle, Sybase, DB2, X.500, or other database type. The FlexRing Data and Recordings Database 56 includes subscriber profile information as well as media selections. Moreover, the Database 56 may, instead of storing actual media itself for a particular media selection, store the URL or other form of pointer to another storage location for a particular media selection.

Figure 2:
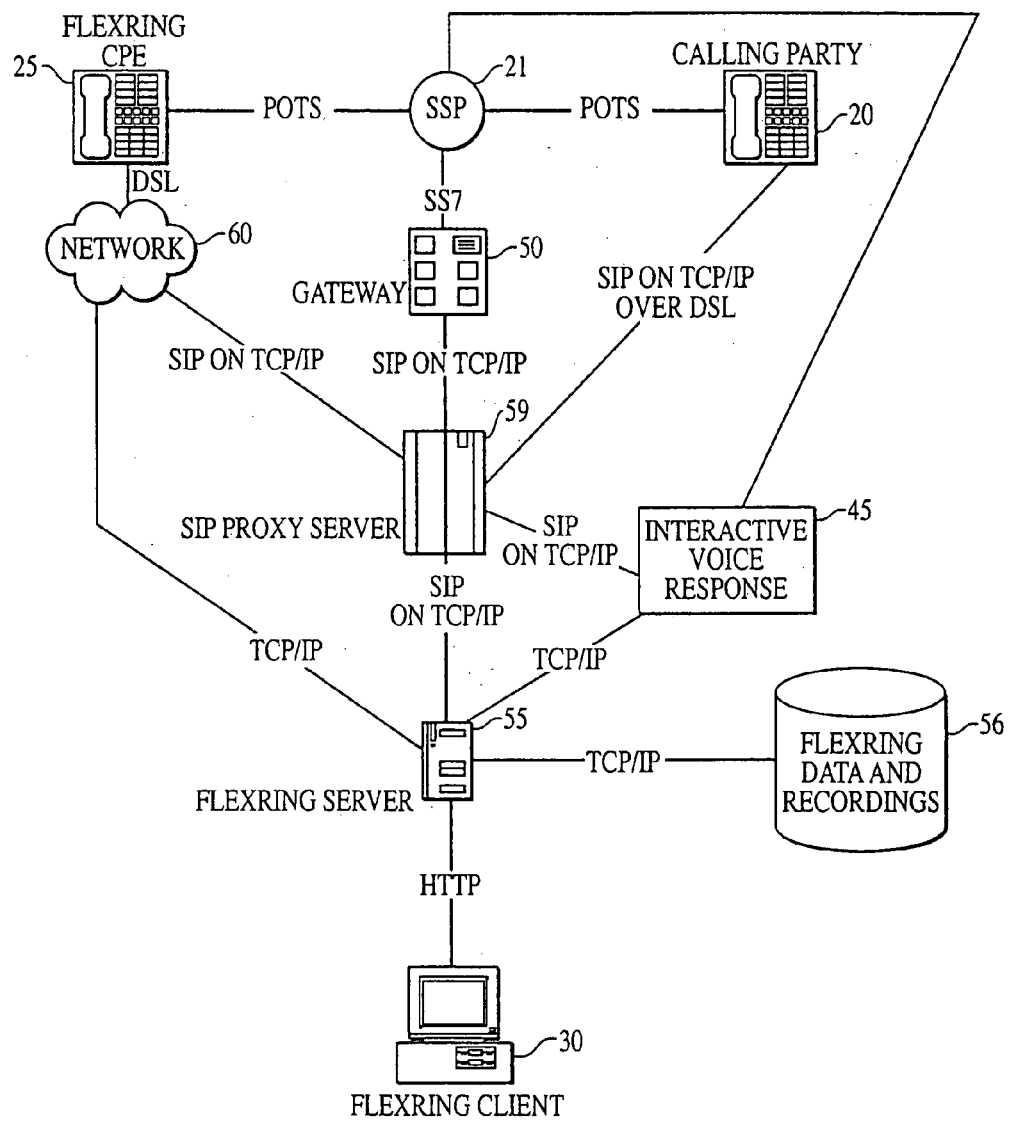
FIG. 2 is a block diagram showing an exemplary flexible ring-tone service telecommunications network associated with a PSTN and a Voice over Internet Protocol (VoIP) network, according to an aspect of the present invention.

FIG. 2 is a block diagram showing an exemplary FlexRing Service telecommunications network associated with a PSTN and a Voice over Internet Protocol (VoIP) network, according to an aspect of the present invention. The architecture of this network is similar to FIG. 1, except that it includes a SIP Proxy Server 59 between a Gateway 50 and the FlexRing Server 55. It additionally differs in that another connection is made from IVR 45 to the SIP Proxy Server 59 to enable provisioning over a VoIP link to IVR 45.

The SIP Proxy Server 59 of the VoIP network functions similarly to the SSP 21 and the SCP 23 in a pure PSTN architecture. That is, it is used to route VoIP calls. The SIP Proxy Server 59 communicates with the CPE 25, the Gateway 50, the IVR 45 and the FlexRing Server 55 using SIP over a TCP/IP connection. The SIP Proxy Server 59 may be implemented using a CISCO SIP proxy server, Partysip SIP proxy server, CommWorks SIP proxy server, or other SIP compliant proxy server on, for example, a SUN Netra platform.

The Gateway 50 bridges the PSTN and an Internet Protocol (IP) network to support VoIP calls that originate and/or terminate on the PSTN. The Gateway 50 communicates with the SSP 21 using the SS7 protocol. The Gateway 50 additionally is able to communicate with the FlexRing Server 55 using SIP over a TCP/IP connection. This configuration allows VoIP technology to be used with or in place of the PSTN network when the Calling Party 20 calls the CPE 25. The Gateway 50 may be implemented using a Lucent Softswitch—VoIP Transit Solution.

The IVR 45, in addition to being connected to the SSP 21, is connected to the SIP Proxy Server 59 and the FlexRing Server 55 allowing provisioning to occur using a subscriber's CPE 25 over a VoIP network. The IVR 45 of FIG. 2, in addition to the connections and functionality shown in FIG. 1 and the description, thereof, includes SIP functionality to communicate with the SIP Proxy Server 59 on a VoIP network over a TCP/IP link.

The architecture of FIG. 2 additionally shows the FlexRing CPE 25 having a DSL and Plain Old Telephone System (POTS) connections. For VoIP calls originating from the Calling Party 20 on a POTS device, the call is connected via a SSP 21 to a Gateway 50. At Gateway 50, the call is bridged from the POTS network to a VoIP network. For pure VoIP, calls not using the POTS network, calls are directed from the Calling Party 20 to the SIP Proxy Server 59 with no POTS network elements involved. The call is then routed as normal via the SIP protocol.

While SIP is mentioned throughout in the description of FIG. 2 and the discussion of communications using VoIP, other protocols may be used. For example, ITU H.323, MEGACO/ITU H.248, and the IETF Media Gateway Control Protocol (MGCP) may be used.

Figure 3:
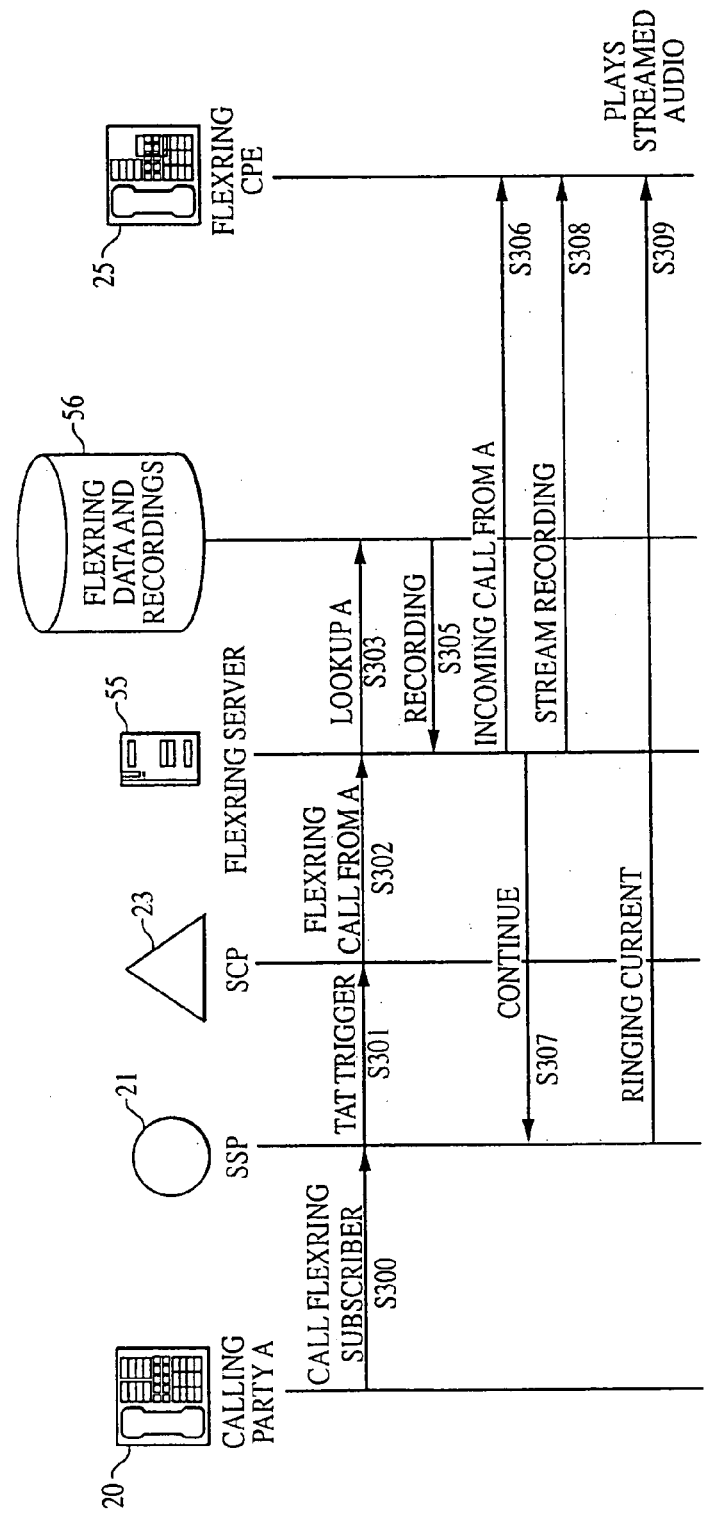
FIG. 3 is a call flow diagram illustrating an incoming call to a subscriber using streaming media, according to an aspect of the present invention.

FIG. 3 is a call flow diagram illustrating an incoming call to a subscriber using streaming media, according to an aspect of the present invention. FIG. 3 shows the messages that would be exchanged among FlexRing elements in the PSTN to generate a special ring-tone by streaming the ring-tone from the FlexRing Server 55. The format of ring-tones can include any streamable format or any format not typically streamed (e.g., RealNetwork's Real Audio, Microsoft's Windows Media Audio, WAV, MP2, MP3, MP4, GIF, or JPEG).

Initially, the Calling Party 20 calls a FlexRing subscriber at step S300. The FlexRing subscriber's SSP 21, recognizing that a call is incoming for the subscriber, generates an AIN TAT trigger message to its associated SCP 23 at step S301. The SCP 23 determines whether the receiving party of the call is a FlexRing subscriber. If the receiving party is not a FlexRing subscriber, the call is processed as normal. If the receiving party is a FlexRing subscriber, the SCP 23 generates a message to the FlexRing Server 55 including information about both the calling party and the FlexRing subscriber, step S302, and instructs the FlexRing Server 55 to generate a ring-tone to the FlexRing subscriber's CPE 25 for a call coming from the Calling Party 20. The FlexRing Server 55 then looks up the ring-tone information the FlexRing subscriber has associated with the Calling Party 20 in the FlexRing Database 56 at step S303. The FlexRing Database 56 then returns the correct ring-tone media, URL, or other type of pointer at step S305 to the FlexRing Server 55. If there is no specified ring-tone, a default ring-tone may be used, or the FlexRing Server 55 may inform the SCP 23 to generate a ring-tone current such as typically done in legacy telephone systems at step S309 for the CPE 25 to ring.

If a default or specified ring-tone is present, the FlexRing Server 55 then informs the CPE 25 that it has an incoming call from the Calling Party 20 at step S306, the CPE 25 disables normal ringing functions (i.e., response to ringing current applied to its line by the SSP 21) so that the subscriber's customized ring-tone can play. The FlexRing Server 55 then informs the SCP 23 that call processing may continue at step S307. The SCP 23 then informs the SSP 21 accordingly at step S307. The SSP 21 generates ringing current on the line to the FlexRing CPE 25 just as with a normal call at step S309. However, the FlexRing CPE 25 will not respond by ringing if a default or customized ring-tone is available since the function was previously disabled after step S306. The FlexRing Server 55 then streams the selected ring-tone to the FlexRing CPE 25 at step S308. The Flexeing Server 55 may stream the media from the Database 56 to the CPE 25 or it may stream the media from another location based on a Database 56 supplied URL or other pointer. The CPE 25 then plays the stream as it is received from the FlexRing Server 55.

Figure 4:
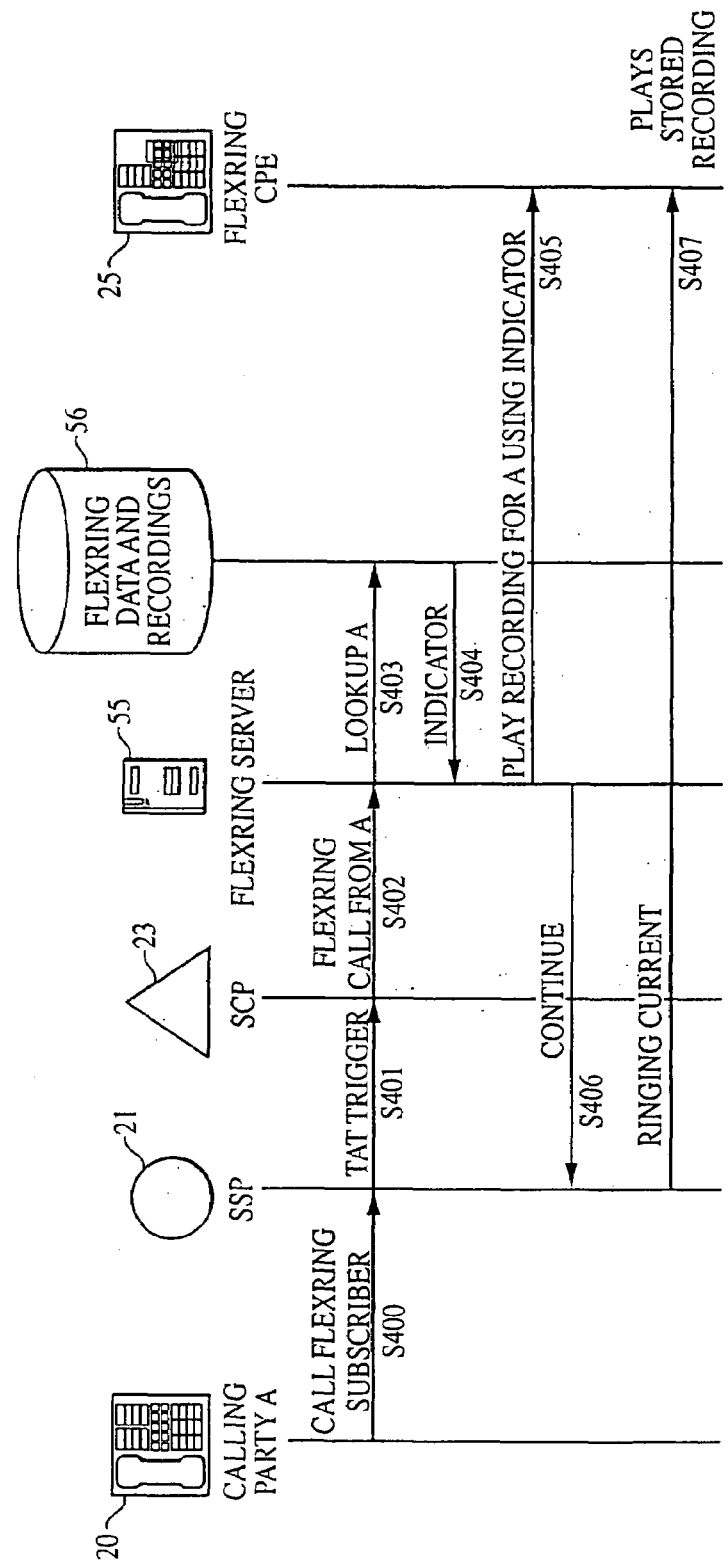
FIG. 4 is a call flow diagram illustrating an incoming call to a subscriber using CPE stored media, according to an aspect of the present invention.

FIG. 4 is a call flow diagram illustrating an incoming call to a subscriber using the CPE 25 stored media, according to an aspect of the present invention. In this embodiment of the invention, media files are preloaded into the FlexRing CPE 25. These media files are played upon receipt of a message (stimulus) from the FlexRing Server 55. Ring-tone format can be anything supported by the CPE 25, including WAV, MP2, MP3, MP4, JPEG, or GIF files.

Initially, a Calling Party 20 calls a FlexRing subscriber at step S400. The FlexRing subscriber's SSP 21, recognizing that a call is incoming for the subscriber generates an AIN TAT trigger message to its associated SCP 23 at step S401. The SCP 23 determines whether the receiving party of the call is a FlexRing subscriber. If the receiving party is not a FlexRing subscriber, the call is processed as normal. If the receiving party is a FlexRing subscriber, the SCP 23 generates a message to the FlexRing Server 55 including information about both the calling party and the FlexRing subscriber, step S402, and sends a custom message to the FlexRing Server 55 instructing the Server 55 to generate a ring-tone to the FlexRing CPE 25 for a call from the Calling Party 20. The FlexRing Server 55 then looks up the ring-tone information the FlexRing subscriber has associated with the Calling Party 20 in the FlexRing Database 56 at step S403. The FlexRing Database 56 subsequently returns a FlexRing ring-tone indicator associated with the Calling Party 20 at step S404.

The FlexRing Server 55 then informs the CPE 25 that it has an incoming call from the Calling Party 20 at step S405 by sending the CPE 25 a custom message including the FlexRing ring-tone indicator and an instruction to play the media associated with the indicator. The CPE 25 then disables normal ringing functions (i.e., response to ringing current applied to its line by the SSP 21) and plays the default ring-tone or the ring-tone it has previously stored for the Calling Party 20. If no ring-tone is associated with the caller, the CPE 25 may leave its normal ringing functions enabled so that ringing current from the SSP 21 will cause the CPE 25 to ring as usual. The Flex Ring Server 55 then informs the SCP 23 that call processing may continue at step S406. The SCP 23 informs the SSP 21, accordingly, that call processing may continue at step S406. The SSP 21 then generates ringing current on the line to the FlexRing CPE 25 just as with a normal call at step S407. However, the FlexRing CPE 25 may not respond to the ringing current by normally ringing if a default or stored ring-tone is associated with the Calling Party 20. If a default or stored ring-tone indicator is associated with the Calling Party 20, the associated media is played by the CPE 25.

Figure 5:
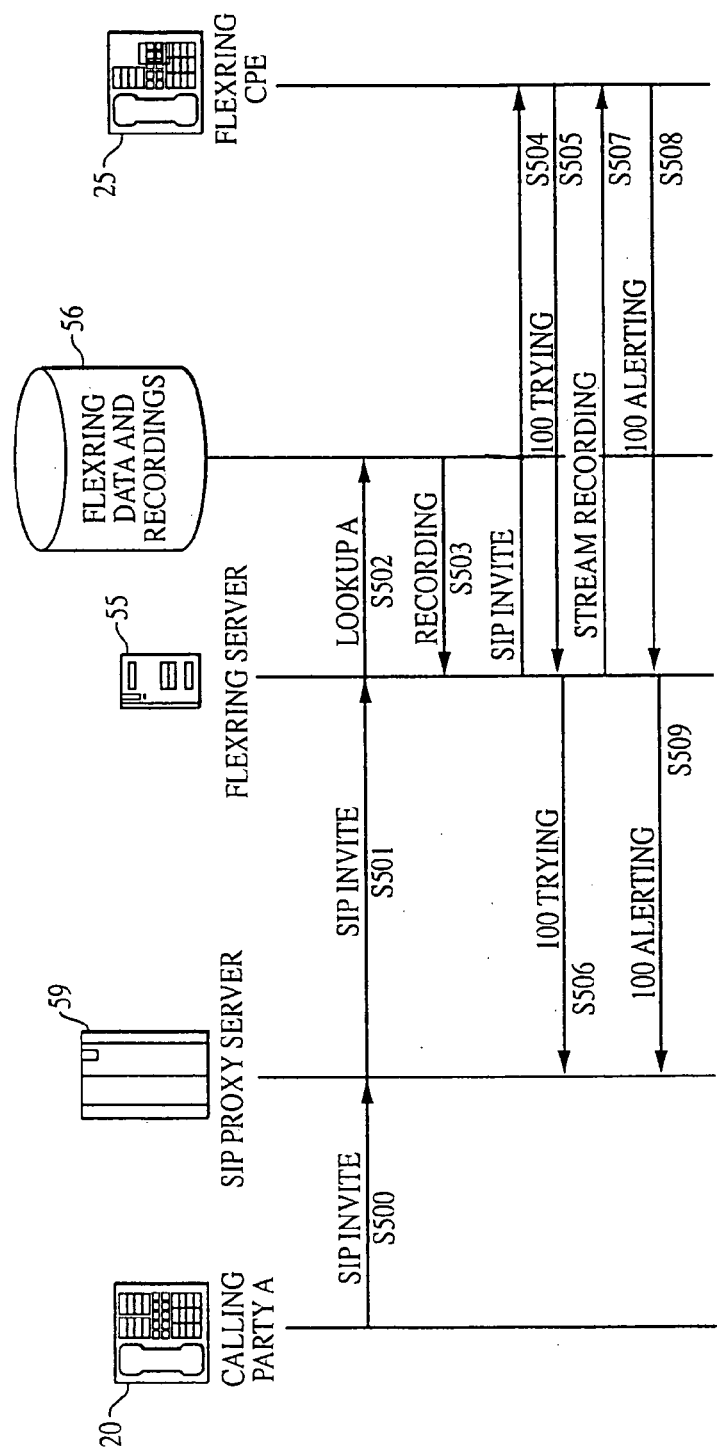
FIG. 5 is a call flow diagram illustrating an incoming call to a subscriber using VoIP, according to an aspect of the present invention.

FIG. 5 is a call flow diagram illustrating an incoming call to a subscriber using VoIP, according to an aspect of the present invention where a ring-tone is streamed from a FlexRing Server 55 to a subscriber's CPE 25.

Initially, a Calling Party 20 calls a FlexRing CPE 25 by sending a SIP INVITE message to a SIP Proxy Server 59 at step S500. The FlexRing subscriber's SIP Proxy Server 59 detects the incoming call to a subscriber's CPE 25 and determines whether the subscriber is also a subscriber to the FlexRing service by searching a database including the services associated with a particular subscriber. If the subscriber is not a FlexRing subscriber, the call is completed as normal. If the subscriber is a FlexRing subscriber, the SIP Proxy Server 59 executes the FlexRing service by sending an INVITE message to the FlexRing Server 55 at step S501. In this embodiment, the FlexRing Server 55 performs both FlexRing services and SIP Proxy functions to assist in the VoIP connection.

The FlexRing Server 55 then looks up the ring-tone the FlexRing subscriber has associated with the Calling Party 20 in the FlexRing Data and Recordings Database 56. The FlexRing Database 56 then returns the correct ring-tone media at step S503. If there is no specified ring-tone, a default ring-tone may be used. The FlexRing Server 55 then sends a SIP INVITE to inform the CPE 25 that it has an incoming call from the Calling Party 20 at step S504. The CPE 25 then disables normal ringing functions (i.e., generating its own ringing, which is the usual case with a SIP phone) and prepares to play the streamed ring-tone. If there is no default or associated ring-tone, the INVITE message at step S504 indicates this, and the CPE 25 generates its own ring-tone as usual, returning a SIP 100 Trying response at step S505 which is passed on to the SIP Proxy Server 59 and a SIP 100 Alerting response when ringing starts at step S508 which is passed on to the SIP Proxy Server 59 at step S509. If a default or an associated ring-tone is found, and the CPE 25 is ready for a streaming ring-tone, the FlexRing CPE 25 returns a SIP 100 Trying message to the FlexRing Server 55 at step S505, which then forwards it on to the SIP Proxy Server 59 at step S506.

The FlexRing Server 55 then streams the selected ring-tone to the FlexRing CPE 25 at step S507. Once the CPE 25 starts to play the ring-tone, it returns a SIP 100 Alerting message to the FlexRing Server 55, which forwards the message to the SIP Proxy Server 59 at step S508. The CPE 25 then plays the ring-tone associated with the Calling Party 20 until the call is either abandoned by the Calling Party 20 or answered by the subscriber.

A similar process occurs where the associated media files are stored in the subscriber's CPE 25, except that instead of a recording being returned at step S503, FlexRing subscriber information including a ring-tone indicator is sent from the FlexRing Data and Recordings Database 56 to the FlexRing Server 55. And, instead of streaming media being sent to the CPE 25 at step S507, the FlexRing Server 55 sends a stimulus/ring-tone indicator to tell the CPE 25 which ring-tone media to play. The ring-tone indicator includes information regarding which ring-tone to play based on the media associated by the subscriber to the Calling Party 20. The CPE 25 then plays the ring-tone associated with the Calling Party 20 until the call is either abandoned by the Calling Party 20 or answered by the subscriber.

The Calling Party 20 may additionally call the subscriber's CPE 25 using VoIP from a standard PSTN device. This is accomplished using a VoIP gateway 50. The call flow is similar to that of FIG. 5, except, instead of a SIP INVITE being sent by the Calling Party 20 at step S500, the call is processed by the SSP 21 which sends a TAT query to the Gateway 50. The Gateway 50 then sends a SIP INVITE signal to the SIP Proxy Server 59 on behalf of the Calling Party 20. The call flow then progresses as shown in FIG. 5.

Stopping a Ring Tone

There are several ways to stop the playing of a special ring-tone. Which method used depends on how the ring-tone is being generated (streamed or stimulus), why the ring-tone is being stopped (the Calling Party 20 abandons or the FlexRing CPE 25 is answered), and the level of AIN technology available in the PSTN.

If ring-tones are streamed, some solutions in the PSTN can be implemented on an AIN originating and terminating call state machine (Originating Basic Call State Model (OBCSM) and Termination Basic Call State Model (TBCSM)) using triggers. For example, if the Calling Party 20 abandons a call, the SSP 21 sends a query to the SCP 23 which responds with abandon trigger information. If the CPE 25 is answered, the SSP 21 sends a query to the SCP 23 which responds with answer trigger information. In either case, the trigger information is sent to the FlexServ Server 55 which then terminates the ring-tone string being sent to the CPE 25. The abandon and answer triggers are defined in Capability Set 1 of the International Telecommunications Union (ITU) Q.1200 series standard.

Streaming ring-tones may also be terminated without using AIN abandon or answer triggers. When a Calling Party 20 abandons a call before it is answered, the end SSP 21 will cease to generate ringing current as is usually done when a calling party abandons a call prior to answer. The CPE 25, upon detecting that ringing current is no longer present, stops playing the ring-tone and sends a message to the FlexRing Server 55 telling it to stop streaming. When the FlexRing CPE 25 is answered, the CPE 25 will signal an off-hook/answer as usual to the SSP 21, thus, stopping ringing current. The CPE 25 will also stop playing the ring-tone and sends a message to the FlexRing Server 55 telling it to stop streaming.

The FlexRing Server 55 may also terminate streaming after a certain amount of time set by the FlexRing Service provider or subscriber or when the media selection is over. Media may be selected by the subscriber to play repeatedly until either the Calling Party 20 abandons the call or the CPE 25 is answered. In such a scenario, the streaming media may play indefinitely. For this reason, the FlexRing Service provider or the subscriber may configure the streaming to terminate after a certain amount of time. Alternatively, the streaming media may be programmed by the FlexRing Service Provider or subscriber to terminate at the end of a media selection.

In the case of a stimulus ring-tone, the CPE 25 is already in charge of playing its local, pre-stored ring-tone. If the Calling Party 20 abandons the call before answering, ringing current will no longer be applied as is normally done. The CPE 25 will detect this and stop playing ring-tone. If the call is answered at the CPE 25, the CPE 25 need only respond to the off-hook on the CPE 25 by ceasing to play ring-tone.

Because a VoIP call does not generate a ring current as does a call in a PSTN, ring-tone termination in a VoIP environment using SIP is similar except that a SIP BYE message from the Calling Party 20 to the subscriber's CPE 25 signals a call abandon by the Calling Party 20, while a SIP 200 OK message from the called CPE 25 to the Calling Party 20 signals an answer.

For example, in a streaming scenario, when the Calling Party 20 abandons a call prior to answer, a SIP BYE message is generated. The CPE 25, upon receiving the SIP BYE message, stops playing ring-tone and tells the FlexRing Server 55 to stop streaming media. When the CPE 25 is answered, the CPE 25 stops playing the streamed media, and a SIP 200 OK message is sent to the Calling Party 20. The FlexRing Server 55 detecting the SIP 200 OK message, then stops streaming the media to the CPE 25.

In a stimulus scenario, since the CPE 25 controls the playing of the media, the FlexRing Server 55 is not given an instruction to stop streaming. When the Calling Party 20 abandons a call prior to answer, the CPE 25 receives a BYE message as described above and stops playing media. When the CPE 25 is answered, the CPE 25 stops playing media and sends a SIP 200 OK message to the Calling Party 20.

Setting Up a Ring-Tone from the Web

Figure 6:
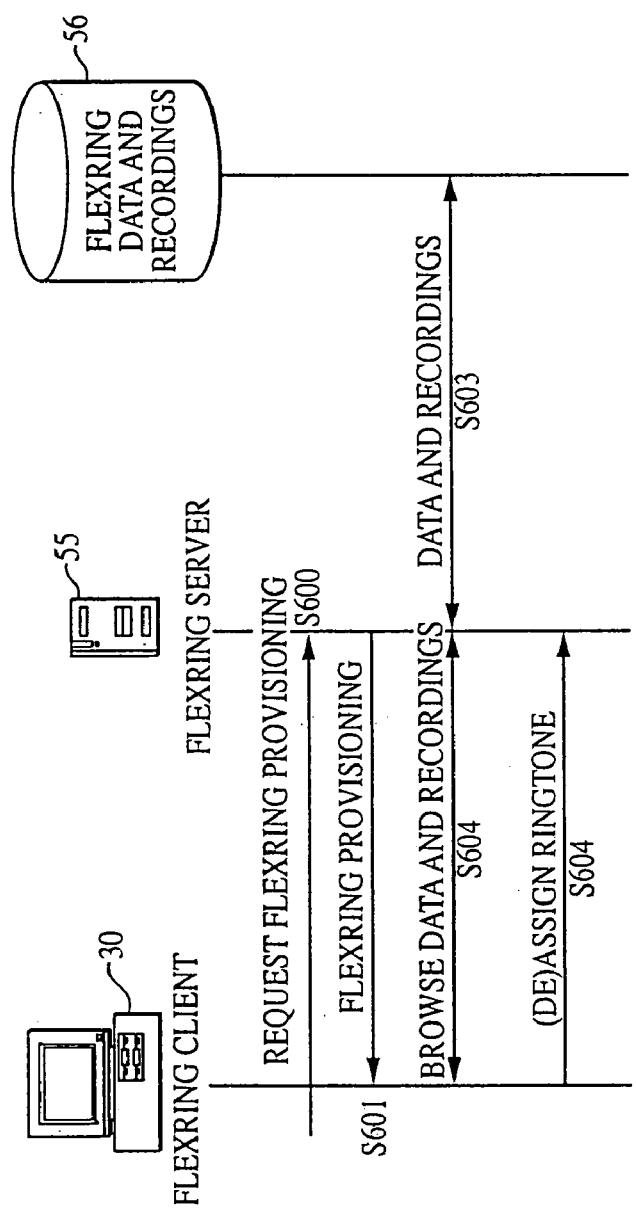
FIG. 6 is a call flow diagram illustrating the provisioning of a flexible ring-tone service, according to an aspect of the present invention.

FIG. 6 is a call flow diagram illustrating the provisioning of a FlexRing service, according to an aspect of the present invention. FIG. 6 shows, in abbreviated form, the messages that would be exchanged among FlexRing elements to set up a ring-tone via a FlexRing Client 30.

Initially the FlexRing subscriber navigates the FlexRing Client 30 to the FlexRing provisioning web page and requests FlexRing provisioning at step S600. The FlexRing Server 55 then validates the subscriber using the PCM framework or its own authentication mechanism. Alternatively, the subscriber can navigate to a PCM web page, authenticate via the PCM authentication process, and then be sent to the FlexRing Server for provisioning. The FlexRing Server 55 then displays provisioning web pages to the subscriber at step S601. Finally, the FlexRing Server 55 browses the current data and available ring-tone clips, including default ring-tone, if any, at steps S602 and S603. Next the FlexRing service assigns or deassigns a ring-tone to a specific caller number in accordance with the subscriber's instruction.

A subscriber may additionally provision the FlexRing service in a similar manner, however, using a CPE 25 or standard telephone over a POTS or VoIP network by interacting with an IVR 45. For example, the IVR 45 may walk the subscriber through a series of menus to provide the subscriber options from which the subscriber may select. The IVR 45 is able to receive DTMF signals from a CPE device, or it may even be equipped with voice response technology to implement subscriber voice instructions. Moreover, the subscriber may obtain the assistance of an operator at a call center to provision FlexRing Service for the subscriber who in turn uses a FlexRing Client 30 or other connection system to the FlexRing Server 55.

The above provisioning process may be used for both streaming and stimulus embodiments of the FlexRing Service. However, obtaining initial media content for either the FlexRing Service for both streaming and stimulus embodiments may be different. For example, in the stimulus embodiment, CPEs may come with media preloaded such that the FlexRing Server 55 already knows what media is on the CPE 25. Alternatively, media may be downloaded into the CPE 25 by the subscriber and registered with the FlexRing Server 55. Registration of media may occur by either subscriber operation or the process may be automatic where the FlexRing Server 55 uses a background process to obtain the loaded media information. Where a preloading of CPEs is not performed, the registration of media within the CPE 25 enables the FlexRing Server 55 to know what media is available on the CPE 25. This enables the subscriber to associate a Calling Party 20 with the available media on the CPE 25 via the FlexRing Server 55.

Figure 7:
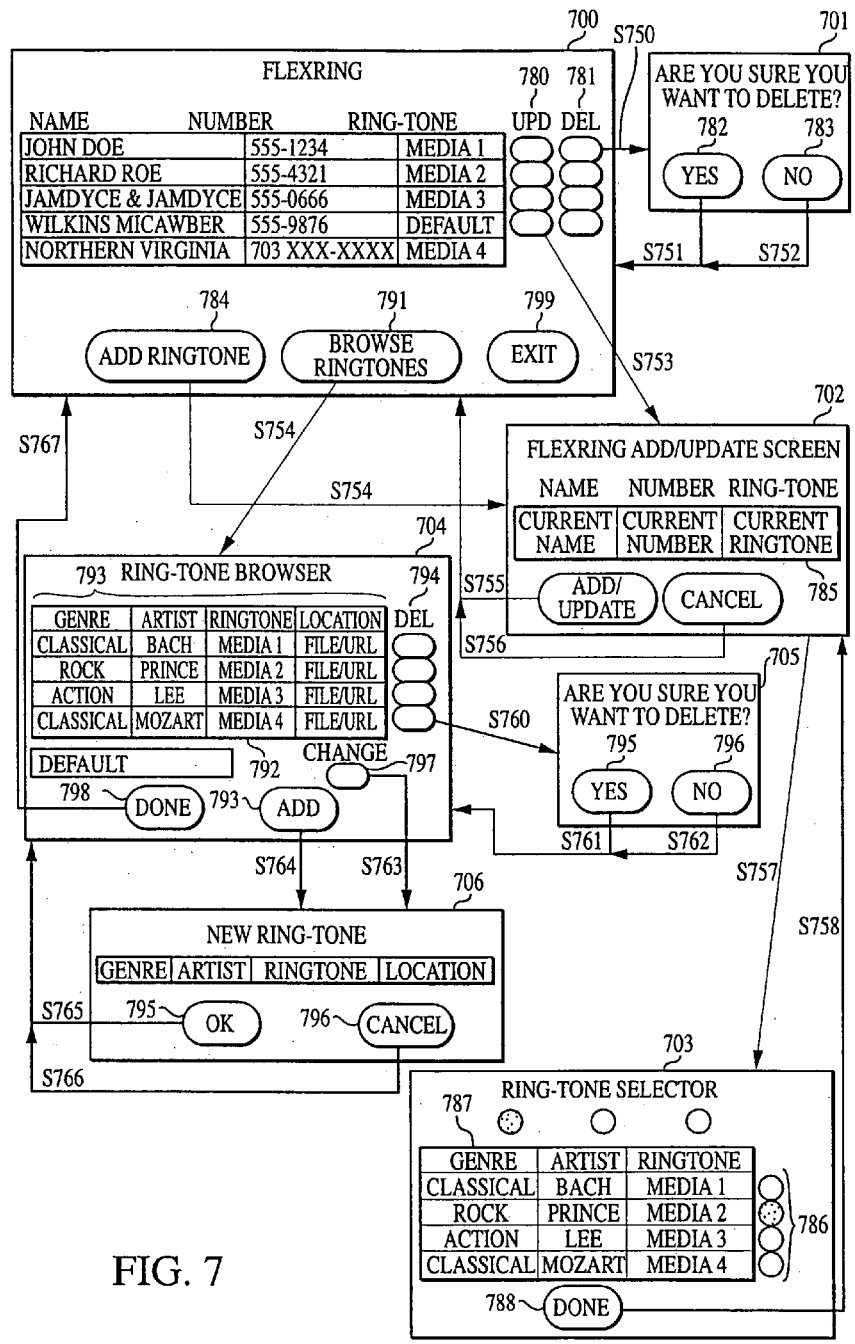
FIG. 7 shows exemplary windows to be displayed at a user's personal computer during provisioning of a flexible ring-tone service, according to an aspect of the present invention.

FIG. 7 shows exemplary windows to be displayed at a user's client device during provisioning of a FlexRing Service, according to an aspect of the present invention. The actual design may vary from what is shown.

Throughout the windows, Name, Number, Ring-tone, Genre, Artist, and Location fields are used. The "Name" field is the name of the Calling Party 20. The "Number" field is the number of the Calling Party 20. The "Ring-tone" field is the ring-tone media selection or category associated by the subscriber to a Calling Party 20. The "Genre" field is a category of media indicating a media genre. The "Artist" field is a category of media indicating a media artist. The "Location" field is the location of the media. This could be a file or URL.

In "FlexRing" window 700, the subscriber's current FlexRing assignments are shown in columns by Name, Number and Ring-tone. To play any of the subscriber's current ring-tones, the subscriber may click on the name of the ring-tone. To update a ring-tone for a particular number, the subscriber may press the "UPD" button 780 for the appropriate number to take the subscriber to the "FlexRing Add/Update Screen" 702 at step S753. To delete a ring-tone for a particular number, the subscriber may press the "Del" button 781 associated with the number. If the Del button 701 is selected, the subscriber is presented with a confirm deletion screen 701 at step S750.

In screen 701, if the subscriber selects the "Yes" button 782 the ring-tone entry is deleted and the subscriber is again presented with the "FlexRing" window at step S751. If the "No" button 783 is selected, the ring-tone entry is not deleted and the subscriber is again presented with the "FlexRing" window 700 at step S752. To add a new ring-tone, the subscriber selects the "Add Ring-tone" button 784 causing the subscriber to be presented with the "FlexRing Add/Update Screen" 702 at step S754. Thus, both the "Add Ring-tone" and "UPD" buttons 784 and 780 of window 700 take the user to the same screen 702.

In window 702, all ring-tone entry fields (e.g., Name, Number, and Ring-tone fields) are blank when adding a ring-tone. When updating a ring-tone, ring-tone fields are filled in with the current information for the entry being updated. Name and number may be entered/changed in their fields on this screen. When the subscriber selects the "Ring-tone" column 785 of window 702, the "Ring-tone Selector" window 703 is presented at step S757.

In window 703, Genre, Artist, and Ring-tone fields are shown in the "Ring-tone Selector" window. The currently assigned ring-tone, if any, is highlighted. The subscriber may change this assignment by selecting vertical buttons 786 next to and horizontal buttons 787 above another ring-tone. In the present example of FIG. 7, the subscriber can select classical music as a genre for the ring-tone by selecting the first horizontal button 787 at the top and the first vertical button 786 to the right. The subscriber can select Bach as the artist for the ring-tone by selecting the second horizontal button 787 at the top and the first vertical button 786 on the right. Moreover, the user can select "media 1" as the selection for the ring-tone by selecting the third horizontal button 787 at the top and the first vertical button 786 to the right. The user may additionally listen to any ring-tone by clicking on its name.

Once the selected Genre, Artist, or Ring-tone is chosen, the user can then press the "Done" button 788 of window 703 and be again presented with the "FlexRing Add/Update Screen" 702 at step S758. Once the selection is complete, the subscriber can select the "Add/Update" button of window 702 to update the ring-tone for the number and again be presented with the "FlexRing" window 700 at step S755. If the subscriber chooses instead to cancel the ring-tone add or update, the subscriber selects the "Cancel" button 790 of window 702 to again be presented with the "FlexRing" window 700 at step S756 for additional provisioning.

Once again at window 700, the subscriber has the additional option to browse ring-tones. By pressing the "Browse Ring-tones" button 791 of window 700, the subscriber is then presented with the "Ring-tone Browser" window 704 at step S759.

In window 704 the subscriber may also browse ring-tones and is presented with Genre, Artist, Ring-tone, and Location columns. The subscriber may make a selection to play any ring-tone by clicking on the Ring-tone button 792 for the desired particular selection. Moreover, a user may place any column in a descending or ascending order by pressing the column headers 793 at the top of each column. For example, if a subscriber wanted to view available country music selections, the subscriber could select the column header 793 for "Genre" and scroll down to country music. Furthermore, if a subscriber wanted to view all media by Mozart, the subscriber could select the column header 793 for "Artist" and scroll down to Mozart. Moreover, if a subscriber wanted to view Beethoven's $5^{th}$ Symphony, the subscriber could select the column header 793 "Ring-Tone" and scroll down to Beethoven's $5^{th}$ Symphony. The subscriber may also delete a ring-tone from their portfolio, perhaps because of limited space, by selecting the "DEL" button 794 next to the ring-tone to be deleted. The subscriber is then presented with window 705 at step S760.

In window 705 the subscriber has the option to confirm a deletion. If the subscriber selects the "Yes" button 795, the ring-tone entry is deleted and the subscriber is again presented with window 704 at step S761 with the item having been deleted. If the subscriber selects the "No" button 796, the ring-tone entry is not deleted and the subscriber is then presented with window 704 at step S762.

In window 704, subscribers may also change the default ring-tone using the "Change" button 797 of window 704. However, in some implementations, the default ring-tone could be deleted. The subscriber may also load a new ring-tone into their portfolio by selecting the "Add" button 793 to be presented with the "New Ring-tone" window 706, at step S764, that specifies a location from which to load the ring-tone.

In window 706, the subscriber is presented with fields Genre, Artist, Ring-tone, and Location. Once a ring-tone has been specified in window 706, the subscriber may select the "OK" button 795 to enter the new ring-tone entry to the subscriber's list of ring-tones and again be presented with window 704 at step S765. If the subscriber chooses not to enter a ring-tone into the subscriber's list of ring-tones, the subscriber may select the "Cancel" button 796 to return to the "Ring-tone Browser", window 704 at step S766.

Once complete with browsing ring-tones using window 704, the subscriber may select the "Done" button 798 to again be presented with the "FlexRing" window 700. While in window 700, the subscriber may then select from the displayed buttons already described or exit the program using the "Exit" button 799.

As mentioned previously, different variations of the windows and flow may be implemented. In addition, windows may also be added to the flow. For example, a window may be added to associate all of a subscriber's device numbers to a list from which all the FlexRing provisioning for the subscriber is applicable. This enables the subscriber to add and update ring-tones so that they can be played on all the subscriber's devices. Moreover, windows could be added for a subscriber to add defaults where some of the subscriber's devices do not play the type of media selected. For example, a subscriber's CPE 25 at home may be able to play MP3 files, while the subscriber's mobile phone may be only able to play tones. In this case, the subscriber could, via the FlexRing Service, program a tone to be played on the mobile phone instead of the normal MP3 file that is played for a particular incoming call number.

FlexRing Logic

Figure 8:
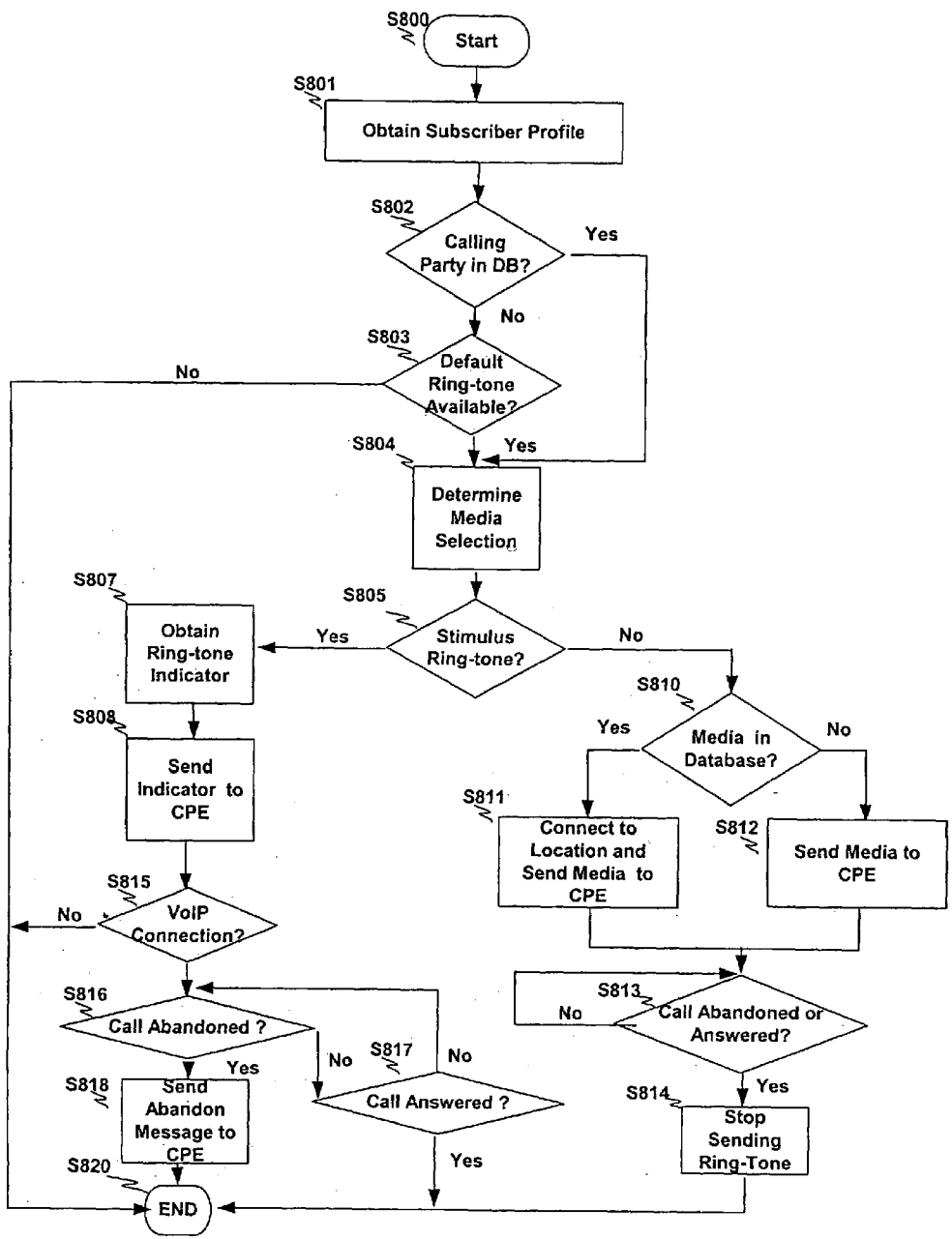
FIG. 8 is an exemplary flow chart illustrating the logic of the flexible ring-tone service, according to an aspect of the present invention.

FIG. 8 is an exemplary flow chart illustrating the logic of the flexible ring-tone service, according to an aspect of the present invention. When a call from a Calling Party 20 is to be processed by the FlexRing Service for a subscriber, the FlexRing Server 55 obtains the subscriber's profile information from the FlexRing Data and the Recordings Database 56 at step S801. The profile information includes the subscriber's associations of media categories (e.g., genre, author, or media selection) to the Calling Party 20 and whether the subscriber prefers a ring-tone stimulus or whether the subscriber prefers ring-tones streamed.

The FlexRing Server 25 then determines whether the subscriber has associated a media category to the Calling Party 20 at step S802 by checking the subscriber's profile for the association. If the subscriber has not associated a media category to the Calling Party 20 at step S802, then the FlexRing Server 25 determines whether a default ring-tone is available by checking the subscriber's profile at step S803. If a default ring-tone is not available at step S803, the process ends at step S820 and the call is processed normally without interference from the FlexRing Service. If, at either step S802 or step S803 the FlexRing Service determines that an association exists between a media category and the Calling Party 20 or a default is available, the FlexRing Server 55 then determines the media selection associated with the Calling Party 20 at step S804.

The FlexRing Server 55 determines the applicable media selection at step S804 by randomly or sequentially choosing a media selection from the available media for the category (e.g., genre or author) associated with the Calling Party 20. If a media selection is already associated with the Calling Party 20, the media selection determination will have been made by the subscriber. The FlexRing Server 55 then determines whether the subscriber prefers a stimulus ring-tone based on the subscriber's profile at step S805.

If the subscriber prefers a stimulus ring-tone as determined at step S805, the FlexRing Server 55 looks up and obtains the ring-tone indicator associated with the media selection from the Database 56 at step S807. The Flexking Server 55 then sends the ring-tone indicator to the subscriber's CPE 25 at step S808. The CPE 25 uses the ring-tone indicator to select and play the media associated with the Calling Party 20. If the Calling Party 20 is not using a VoIP connection as determined at step S815, the process then ends at step S820. If the Calling Party 20 is using a VoIP connection, the FlexRing Server 55 checks if the call has been abandoned by the Calling Party 20 at step S816. If the call has been abandoned, the FlexRing Server 55 sends an abandon message to the CPE 25 and the FlexRing process ends at step S820. The CPE 25 uses the abandon message to terminate ringing. If at step S816 the call is not abandoned, the FlexRing Server 55 then checks if the CPE 25 has been answered at step S817. If the CPE 25 has been answered, the FlexRing process ends at step S820. If the CPE 25 has not been answered, the FlexRing process goes back to step S816 and again checks if the call has been abandoned.

If the subscriber prefers a streamed ring-tone as determined at step 805, the FlexRing Server 55, then determines whether the media selection is in the Database 56 at step S810 by looking up the location of the media in the subscriber's profile. If the media selection is not in the Database 56, the FlexRing Server 55, uses the location information from the subscriber's profile (e.g., a URL) and streams the media from the location to the subscriber's CPE 25 at step S811. If the media selection is in the Database 56, the FlexRing Server 55 streams the media selection from the Database 56 to the subscriber's CPE 25 at step S812.

While the FlexRing Server 55 is streaming the media selection to the CPE 25, it is also checking if a message from either the CPE 25 or the SCP 23 has been sent to the FlexRing Server 55 instructing it to terminate streaming the media at step S813. Such a message will be sent if either the Calling Party 20 has abandoned the call prior to answer or the CPE 25 has been answered. If the call has been abandoned or answered, the FlexRing Server 55 stops streaming the media selection to the CPE 25 at step S814. Alternatively, the FlexRing Server 55 may also terminate after a certain amount of time or when a media selection has ended based on FlexRing Service Provider or subscriber settings. The FlexRing process then ends at step S820.

Where a message type has not been specifically disclosed above, these messages are customized to the FlexRing service and are used as disclosed above.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to E-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards discussed in this application (e.g., SIP, HTML, HTTP, LDAP, SR-3511, TCP/IP, VoIP, URL, URI, URN, and XML) represent examples of the state of the art. Such standards are periodically superseded by faster or more efficient equivalents having essentially the same functions. Accordingly, replacement standards and protocols having the same functions are considered equivalents.

What is claimed is:

1. A telecommunications ring-tone network comprising:
a ring-tone database that stores a plurality of ring-tones for a plurality of users; and
a ring-tone server that:
receives configuration information from a user of the plurality of users comprising information associating a category of ring-tones, wherein the category of ring-tones includes at least one of a genre, an artist, a title, or selection of media to play, with at least one of caller information and a portion of the caller information,
receives an incoming call signal for a call to the user comprising at least part of the caller information,
selects a ring-tone from the plurality of ring-tones based on the configuration information and the incoming call signal, and
streams at least a part of the ring-tone to a communications device of the user in response to the incoming call signal.

2. The telecommunications ring-tone network according to claim 1, wherein each ring-tone is classified into a category and the configuration information includes the category information.

3. The telecommunications ring-tone network according to claim 1, wherein the ring-tone comprises at least one of streaming media and still picture media.

4. The telecommunications ring-tone network according to claim 1, wherein the streamed ring-tone is randomly selected from the category of ring-tones stored on the ring-tone database.

5. The telecommunications ring-tone network according to claim 1, wherein the streamed ring-tone is sequentially selected from the category of ring-tones stored on the ring-tone database.

6. The telecommunications ring-tone network according to claim 1, wherein the category comprises at least one of: genre, artist, and title of media information.

7. The telecommunications ring-tone network according to claim 1, wherein the caller information comprises: telephone number, uniform resource identifier, uniform resource locator, uniform resource name, E-mail address, session initialization protocol uniform resource locator, telephonic uniform resource locator, instant message address, or service management system address information.

8. A telecommunications ring-tone network comprising:
a ring-tone database that stores a plurality of associations between a category of ring tones, wherein the category of ring tones includes at least one of a genre, an artist, a title, or a selection of media to play, and at least one of caller information and a portion of the caller information for a plurality of users, the category of ring tones comprising at least one ring tone; and
a ring-tone server that streams at least a part of the at least one ring-tone to a communications device of a user of the plurality of users in response to an incoming call signal to the user and one of the plurality of associations.

9. The telecommunications ring-tone network according to claim 8, wherein the ring-tone server receives configuration information from a user of the plurality of users comprising the plurality of associations wherein each ring-tone is classified into a category, and the configuration information includes category information.

10. The telecommunications ring-tone network according to claim 9, wherein the category comprises at least one of genre, artist, and title of media information.

11. The telecommunications ring-tone network according to claim 9, wherein the telecommunications ring-tone system is part of an advanced intelligent network.

12. The telecommunications ring-tone network according to claim 8, wherein the ring-tone comprises at least one of streaming media and still picture media.

13. A telecommunications ring-tone network comprising:
a ring-tone database that stores a plurality of ring-tones, wherein each ring-tone is associated with a category comprising a genre, an artist, a title, or a selection of media to play, for a plurality of users; and
a ring-tone server that:
receives configuration information from a user of the plurality of users comprising information associating ring tones to caller information,
receives an incoming call signal for a call to the user comprising at least part of the caller information,
selects a ring-tone from the plurality of ring-tones based on the configuration information and the incoming call signal, and
sends from the network an indicator associated with the ring-tone to a communications device of the user in response to the incoming call signal, the ring-tone being stored locally at the communications device of the user, the indicator comprising information used by the communications device to play the ring-tone.

14. The telecommunications ring-tone network according to claim 13, wherein each ring-tone is classified into a category and the configuration information includes the category information.

15. The telecommunications ring-tone network according to claim 14, wherein the category comprises at least one of genre, artist, and title of media information.

16. The telecommunications ring-tone network according to claim 14, wherein the user can associate a portion of the caller information to a ring-tone category or ring-tone.

17. A method of providing a ring-tone from a network to a user's communications device comprising:
storing, in a network element, a plurality of ring-tones for a plurality of users,
receiving configuration information from a user of the plurality of users comprising information associating a category of ring-tones, wherein the category of ring-tones includes at least one of a genre, an artist, a title, or a selection of media to play, with at least one of caller information and a portion of the caller information,
receiving an incoming call signal for a call to the user comprising at least part of the caller information,
selecting a ring-tone from the plurality of ring-tones based on the configuration information and the incoming call signal, and
streaming, from the network, at least a part of the ring-tone to a communications device of the user in response to the incoming call signal.

18. The method according to claim 17, wherein each ring-tone is classified into a category and the configuration information includes category information.

19. The method according to claim 18, further comprising associating by the user a portion of the caller information to a ring-tone category or ring-tone.

20. The method according to claim 18, wherein the category comprises at least one of genre, artist, and title of media information.

21. The method according to claim 17, wherein the ring-tone comprises at least one of streaming media and still picture media.

22. A method of providing a ring-tone from a network to a user's communications device comprising:
storing a plurality of associations between a category of ring-tones, wherein the category of ring-tones includes at least one of a genre, an artist, a title, or a selection of media to play, and at least one of caller information and a portion of the caller information for a plurality of users, the category of ring tones comprising at least one ring tone; and
streaming, from the network, at least a part of a the at least one ring-tone to a communications device of a user of the plurality of users in response to an incoming call signal to the user and one of the plurality of associations.

23. The method according to claim 22, further comprising:
receiving configuration information from the user of the plurality of users comprising information associating ring-tones to the caller information, each ring-tone being classified into a category, and the configuration information including category information.

24. The method according to claim 23, wherein the category comprises at least one of genre, artist, and title of media information.

25. The method according to claim 23, wherein the caller information comprises a telephone number, uniform resource identifier, uniform resource locator, uniform resource name, E-mail address, session initialization protocol uniform resource locator, telephonic uniform resource locator, instant message address, or service management system address information.

26. The method according to claim 22, wherein the ring-tone comprises at least one of streaming media and still picture media.

27. A method of providing a ring-tone to a user's communication device comprising:
storing a plurality of ring-tones for a plurality of users, wherein each ring-tone is associated with a category comprising a genre, an artist, a title, or a selection of media to play,
receiving configuration information from a user of the plurality of users comprising information associating ring-tones to caller information,
receiving an incoming call signal for a call to the user comprising at least part of the caller information,
selecting a ring-tone from the plurality of ring-tones based on the configuration information and the incoming call signal, and
sending, from a network, an indicator associated with the ring-tone to a communications device of the user in response to the incoming call signal, the ring-tone being stored locally at the communications device of the user, the indicator comprising information used by the communications device to play the ring-tone.

28. The method according to claim 27, wherein each ring-tone is classified into a category and the configuration information includes the category information.

29. The method according to claim 28, wherein the category comprises at least one of genre, artist, and title of media information.

30. The method according to claim 28, further comprising associating by the user a portion of the caller information to a ring-tone category or ring-tone.

31. A computer-readable medium that stores computer-executable instructions for providing ring-tones from a network to a user's communication device, the instructions causing a computer to execute:
receiving configuration information from a user of a plurality of users comprising information associating a category of ring-tones, wherein the category of ring-tones includes at least one of a genre, an artist, a title, or a selection of media to play, with at least one of caller information and a portion of the caller information;
receiving an incoming call signal for a call to the user comprising at least part of the caller information;
selecting a ring-tone from a plurality of ring-tones based on the configuration information and the incoming call signal; and
streaming at least a part of the ring-tone to a communications device of the user in response to the incoming call signal.

32. The computer-readable medium according to claim 31, wherein each ring-tone is classified into a category and the configuration information includes category information.

33. The computer-readable medium according to claim 32, further comprising associating, by the user, a portion of the caller information to a ring-tone category or ring-tone.

34. The computer-readable medium according to claim 32, wherein the category comprises at least one of genre, artist, and title of media information.

35. The computer-readable medium according to claim 31, wherein the ring-tone comprises at least one of streaming media and still picture media.

36. A computer-readable medium that stores computer-executable instructions for providing ring-tone information from a network to a user's communication device, the instructions causing a computer to execute:

receiving configuration information from a user of a plurality of users comprising information associating ring-tones to caller information, receiving an incoming call signal for a call to the user comprising at least part of the caller information, selecting a ring-tone from a plurality of ring-tones, wherein each ring-tone is associated with a category comprising a genre, an artist, a title, or a selection of media to play, based on the configuration information and the incoming call signal, and sending an indicator associated with the ring-tone to a communications device of the user in response to the incoming call signal, the ring-tone being stored locally at the communications device of the user, the indicator comprising information used by the communications device to play the ring-tone.

37. The computer-readable medium according to claim 36, wherein each ring-tone is classified into a category and the configuration information includes the category information.

38. The computer-readable medium according to claim 37, wherein the category comprises at least one of genre, artist, and title of media information.

39. The computer-readable medium according to claim 37, further comprising associating, by the user, a portion of the caller information to a ring-tone category or ring-tone.

\* \* \* \* \*